May 18, 1954    A. B. F. G. RICHARDSON ET AL    2,678,839
SEALING GLAND
Filed Oct. 19, 1949                                 2 Sheets-Sheet 2
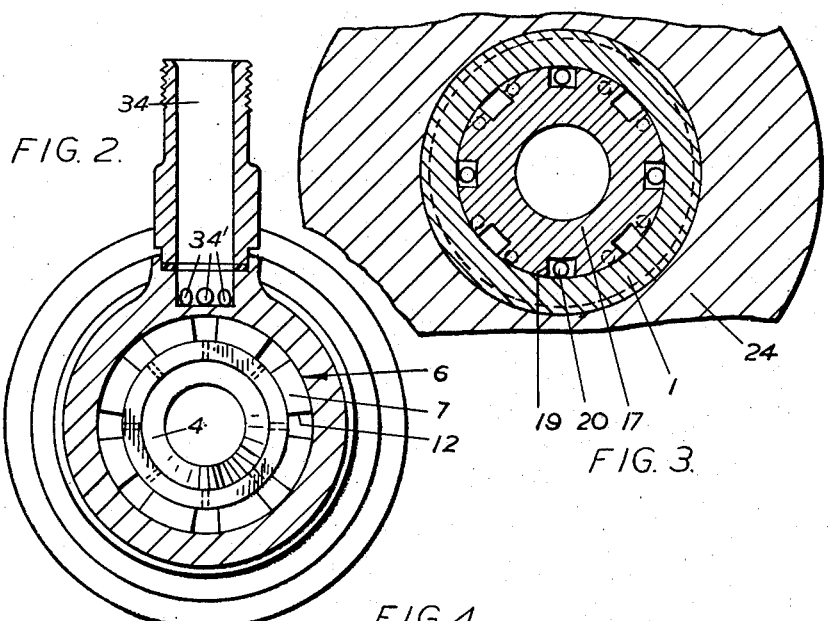
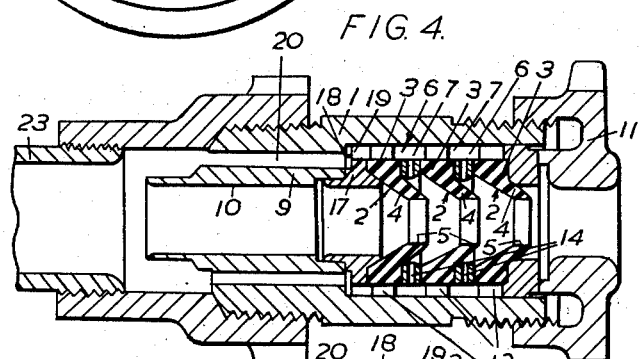
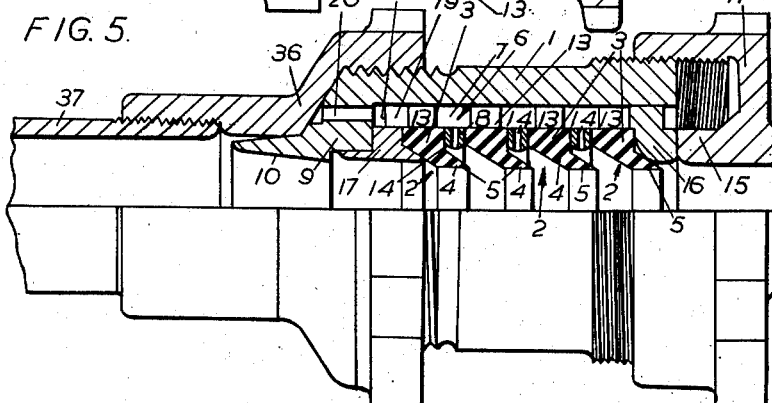
Inventors
Arthur B. F. G. Richardson
Eustace Tunnicliff &
Ivan K. Fisher
Attorneys Patented May 18, 1954

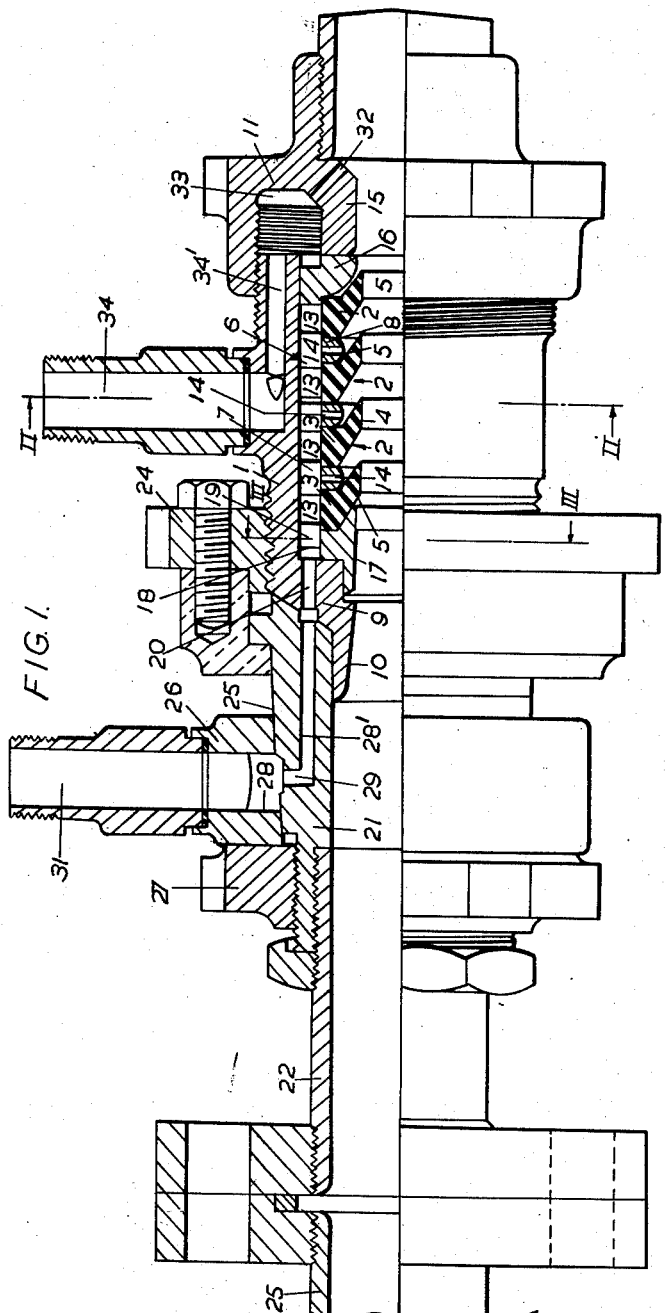

2,678,839

UNITED STATES PATENT OFFICE 2,678,839

SEALING GLAND

Arthur Bruce Fraser Gillespie Richardson, Eustace Tunnicliff, and Ivan Kenneth Fisher, Leigh, England, assignors to British Insulated Callender's Cables Limited, London, England, a British company Application October 19, 1949, Serial No. 122,194

6 Claims. (Cl. 286—16)

This invention relates to means for preventing or limiting the escape of fluid through an opening in the wall of a vessel containing fluid under super-atmospheric pressure during the passage through the opening of an elongated body, such as an insulated wire or cable, hereinafter referred to as a cable, for the sake of brevity. It is concerned with a sealing gland of the kind comprising a soft rubber bush which is pressed into or maintained in engagement with the surface of the travelling cable or substantially so, by subjecting its external surface to fluid pressure which may be the same as or different from the fluid pressure in the vessel. By the present invention we provide an effective sealing gland in which friction between the gland and the surface of the travelling cable is reduced and the risks of damage to such surface correspondingly diminished.

In accordance with our invention our improved sealing gland comprises a gland body in the form of a cylinder housing a number of longitudinally spaced soft rubber bushes each comprising a peripheral flange portion of substantially less diameter than the bore of the cylinder and an inner conical portion having a central aperture for the cable. These bushes which are assembled in the gland body so that they point in the same direction, i. e. the direction of travel of the cable, are separated from one another by annular discs between the peripheral flange portions of the bushes. Each spacing disc has a rim portion which is a sliding fit in the gland body and projects beyond both faces of the central portion of the disc to embrace the flange portions of the neighbouring rubber bushes and maintain them in axial alignment with one another and the gland body. At one end of the cylinder is an end wall having a central aperture for the passage of the cable. Between this wall and a detachable wall at the opposite end of the cylinder are clamped the peripheral flange portions of the rubber bushes and the intercalated spacing discs. Each spacing disc has a number of longitudinally extending slots or holes in its rim portion which serve to place the annular chambers formed between the rubber bushes and the gland body in communication with one another. From these longitudinally extending slots or holes passages extend inwardly of the disc and open into the space between the conical parts of the neighbouring rubber bushes. A port or ports are provided in the wall of the gland body for the supply of liquid under pressure to the interconnected annular chambers.

The invention will now be more fully described with reference to the accompanying drawings, wherein Figure 1 is a view, partly in longitudinal section and partly in elevation, of an example of sealing gland constructed in accordance with the invention and secured to a mounting piece for attachment to the delivery end of a tubular vessel containing steam under super-atmospheric pressure and serving as a vulcanising chamber, Figures 2 and 3 are cross sections of the gland shown in Figure 1, the sections being taken on the lines II—II and III—III, respectively, of Figure 1, Figure 4 is a longitudinal section of a second example of our improved sealing gland mounted at the outlet end of a tubular vessel for containing water under super-atmospheric pressure, and Figure 5 is a view, partly in elevation and partly in section, of a gland similar to that shown in Figure 1, mounted on the outlet end of a tube for containing liquid under super-atmospheric pressure.

On referring to the drawings, it will be seen that in all three cases our improved sealing gland comprises a gland body 1 in the form of a cylinder housing a number of longitudinally spaced soft rubber bushes 2, each comprising a peripheral flange portion 3 of substantially less diameter than the bore of the cylinder and an inner conical portion 4 having a central aperture 5 for the passage of the cable (not shown). The aperture 5 may be normally considerably smaller than the cable cross-section and be enlarged by elastic distention of the conical wall. Alternatively it may be of the same size as or only slightly less than the cable cross-section. In the latter case it is preferred to make the wall of the conical portion somewhat thicker than in the former case and to taper, as shown in Figure 4, from a maximum thickness at the base to a minimum at the aperture. In both forms the cone angle of the bush in its undistended form is preferably about 60°. The rubber bushes 2 are separated from one another by annular spacing discs 6, each having a rim portion 7, which is a sliding fit in the bore of the cylinder and projects beyond both faces of the central portion 8 of the disc to embrace the flange portions 3 of the neighbouring rubber bushes 2, and maintain them in axial alignment with one another and the gland body.

At the inlet end of the cylinder is an end wall 9 having a central aperture 10 for the passage of the cable. Between the wall 9 and a detachable wall 11 at the outlet end of the cylinder are clamped the circumferential flange portions 3 of the rubber bushes and the intervening spacing discs 6 which are of metal, for instance, brass. As will be seen from Figure 2, each spacing disc has a number of longitudinally extending slots or holes 12 in its rim portion 7 which serve to place the annular chambers 13 formed between the rubber bushes and the gland body 1 in communication with one another. From these slots or holes 12, passages 14 extend inwardly to the disc and open into the space between the conical parts 4 of the neighbouring rubber bushes. The passages 14 are shown in Figure 2 of the drawings as radial with respect to the axis of the gland but this is not essential. The same figure shows the longitudinally extending slots or holes 12 uniformly distributed around the rim of each spacing disc. This also is preferable where the cable is of circular cross-section.

The detachable end wall 11 of the gland body 1 takes the form of a hand nut adapted to screw on the open end of the gland body and having an annular hub portion 15 directed inwardly towards the interior of the gland body and adapted to engage the face of a thrust washer 16 which is a sliding fit in the bore of gland body and bears upon the adjacent end face of the rim 3 of the rubber bush 2 next to it. Preferably the adjoining internal edge of the washer 16 is rounded off and forms a support for the conical portion of the bush. It will be appreciated, however, that this washer may be omitted and the face of the annular hub 15 may bear directly upon the end face of the rim on the nearest rubber bush 2.

It is also preferred, as shown in the drawings, to interpose between the fixed end wall of the gland body and the rubber bush next to it a metal bush 17 serving as a guide to locate the cable centrally with respect to the sealing gland. As will be seen most clearly from Figure 3, this bush has a rim portion 18 which is displaced longitudinally with respect to the hub portion in engagement with the rubber bush 2, so as to leave an annular clearance between the fixed end wall 9 of the gland body and the rim 18 and to embrace the rear end of the neighbouring rubber bush 2. The rim 18 is furnished with slots or apertures 19 in the same way as are the rims of the spacings discs 6.

The ports for the supply of liquid under pressure to the interconnected annular chambers 13 take the form of longitudinally extending passages 20 in the end wall 9 of the gland body which are distributed around the central cable aperture 10. These passages open into the annular chamber between the end wall 9 and the slotted or apertured rim 18 of the guide bush 17 but where the guide bush 17 is omitted, the ports 20 will open directly into the annular chamber between the first rubber bush 2 and the circumferential wall of the body 1.

Referring now more particularly to Figure 1 of the drawings, it will be seen that the outer end surface of the gland body comprises a spigot surrounded by a conical end face. The former fits in the bore of a tube 21 and the latter makes joint with a corresponding face on the end of the tube 21 which is secured by means of a screw joint on the end of a short length of pipe 22 adapted to make a flange joint with the outer end of the tubular vulcanising chamber 23. The gland body 1 and the tube 21 are held together by means of a nut 24 made captive on the tube 21. On a conical surface 25 on the tube 21 is fitted a ring 26 which is held in place by a nut 27. In the internal surface of this ring is a groove 28 which forms an annular feed chamber surrounding the tube 21. This feed chamber communicates with the ports 20 in the gland body by means of a number of longitudinally extending passages 28' and radially extending passages 29 in the wall of the tube, the necessity for securing alignment of the passages 20 and 28' being avoided by the provision of registering annular grooves 30 in the jointed surfaces of the body and the tube 21. Alternatively the gland body and the tube 21 may be integral. Water or other suitable liquid under pressure is supplied to the annular feed chamber surrounding the tube 21 by means of a supply pipe 31.

Where, as in all the illustrated examples, longitudinally extending passages 20 are provided in the end wall of the gland body for the supply of liquid under pressure to the gland, the gland may, as shown in Figure 4, be so mounted in the outlet opening in the wall of a vessel adapted to contain liquid under pressure that these passages open into the pressure vessel itself, thus eliminating the fittings 21 and 26, which are used when the pressure medium, for instance water, supplied to the gland differs from the medium, for example steam, contained in the vessel with which the gland is used.

In some cases, as where the cable passes directly from a vulcanising chamber into a cooling chamber, it is required to provide a sealing gland between two vessels which contain different fluids under pressure or which contain similar fluids under different pressures. In some cases the pressure medium for the second vessel may be fed into that vessel through the gland body. For this purpose, ports 32 may be provided in the detachable end wall which lead from an annular supply chamber 33 formed by an annular groove around the hub 15 of the nut 11. This chamber is fed through a supply pipe 34 communicating with the chamber 33 through a group of longitudinally extending passages 34' in the wall of the gland body.

The symmetrical arrangement of passages for the admission of backing pressure liquid to the rubber bushes of our improved gland ensures substantial uniformity of pressure between the bush and the cable throughout its circumference, thus minimising any tendency of the gland to distort the cable passing through it. This is of especial importance when the gland is used at the outlet end of a vulcanising chamber for the vulcanisation of rubber covered wires and cables as a continuous process. When the gland is being used as an outlet gland, the provision of a number of ports in the end wall of the gland body, in conjunction with the formation of separate but mutually intercommunicating annular chambers between each rubber bush and the wall of the gland body, ensures that the backing pressure of the liquid is a maximum at the innermost rubber bush where it is most required. The backing pressure applied to the remaining bushes may be less owing to the labyrinthine nature of the path. This is no disadvantage however since the pressure of any fluid leaking along the cable surface from the vessel will be reduced at each bush and hence the tendency for the bush to be lifted away from the cable diminished.

Where the gland is used at the outlet end of a cooling tube containing water under pressure into which the cable passes as it leaves the vulcanising chamber, it may be advantageous to allow a small escape of water through the gland in order to maintain the temperature of the cooling tube constant. In such cases, we have found it possible to dispense with a separate supply of water or other liquid for the purpose of exerting external pressure on the conical parts of the rubber bushes of the gland and that we may, as shown in Figure 5, secure the gland to the outlet end of the cooling tube 37 by means of a connecting piece 36 which blanks off ports 20 in the end wall of the gland. In this case the natural spring in the rubber bushes is relied upon to provide for the maintenance of the required pressure in the cooling tube.

In the specification the term "rubber bush" includes in addition to bushes of vulcanised natural rubber compositions bushes of other moulded materials, for example, neoprene compositions, having similar properties as regards flexibility and elasticity at the working temperature of the gland.

In the specification the gland body has been described as a "cylinder." It is to be understood that this term is not to be construed narrowly and that in referring to the "bore of the cylinder" we do not necessarily imply that the bore is of circular cross-section or that it is of the same cross-section throughout. In the drawings the rubber bushes in each gland body, and their spacing washers, have been shown as identical but it will be appreciated that bushes of different external diameter and wall thicknesses may be used in the same gland body, for instance, stouter bushes at the inlet end than at the outlet end, and that the annular chambers 13 may be larger at the outlet end than at the inlet end to provide for a reduction in pressure of the backing pressure liquid. In such cases the bore of the cylinder may be stepped.

What we claim as our invention is:

1. A gland for effecting a seal between a wall of a vessel containing fluid under pressure and a cable passing through the wall, comprising a cylindrical gland body having a circumferential wall and centrally apertured end walls, said end walls being relatively adjustable in the direction of the axis of said gland body, a plurality of soft rubber bushes and intercalated annular spacing discs clamped in said gland body between said end walls, said bushes having centrally apertured inner conical portions and peripheral flange portions at the larger ends of said conical portions and said spacing discs each having a central portion lying between the peripheral flange portions of two neighbouring rubber bushes, an internal surface surrounding the conical portion of one of the two neighbouring rubber bushes, and a rim portion projecting beyond both faces of the central portion to embrace the adjacent ends of the flange portions of the neighbouring rubber bushes to align them axially in the gland body and to form between each two spacing discs an annular chamber whose side walls are formed by the rim portions of said discs and whose inner circumferential wall is formed by the flange portion of the rubber bush between said two discs and whose outer circumferential wall is formed by the wall of said cylinder, the rim portion of each disc having a plurality of circumferentially distributed apertures whereby said annular chambers are in communication with one another and the central part of each disc having a plurality of passages extending from said apertures in the rim portion to the internal surface of the disc, and a guide bush disposed between one end wall of the gland body and the rubber bush next to it and comprising a hub portion and an apertured rim portion displaced longitudinally with respect to said hub portion whereby to leave an annular clearance between that end wall and the rim portion and to embrace the adjacent end of that rubber bush.

2. A gland for effecting a seal between a wall of a vessel containing fluid under pressure and a cable passing through the wall, comprising a cylindrical gland body having a circumferential wall and a pair of end walls each having a central cable aperture, one of said end walls being adjustable in the direction of the axis of said gland body relative to the other of said end walls, a plurality of soft rubber bushes and intercalated annular spacing discs housed in said gland body and clamped between said end walls, said rubber bushes having centrally apertured inner conical portions and peripheral flange portions at the larger ends of said conical portions and said spacing discs each having a central portion lying between the peripheral flange portions of two neighbouring rubber bushes, an internal surface surrounding the conical portion of one of the two neighbouring rubber bushes, and a rim portion projecting beyond both faces of the central portion to embrace the adjacent ends of the flange portions of the neighbouring rubber bushes to align them axially in said gland body and to form between each two spacing discs an annular chamber whose side walls are formed by the rim portions of the said discs and whose inner circumferential wall is formed by the flange portion of the rubber bush between said two discs and whose outer circumferential wall is formed by the wall of said cylinder, the rim portion of each disc having a plurality of circumferentially distributed apertures whereby said annular chambers are in communication with one another and the central part of each disc having a plurality of passages extending from said apertures in the rim portion to the internal surface of the disc, one end wall of said gland body having distributed substantially symmetrically around its central cable aperture a plurality of longitudinally extending ports for the supply of liquid under pressure to said intercommunicating annular chambers.

3. A gland for effecting a seal between a wall of a vessel containing fluid under pressure and a cable passing through the wall, comprising a cylindrical gland body having a circumferential wall and a pair of end walls each having a central cable aperture and being relatively adjustable in the direction of the axis of said gland body, a plurality of soft rubber bushes and intercalated annular spacing discs housed in said gland body and clamped between said end walls, said rubber bushes having centrally apertured inner conical portions and peripheral flange portions at the larger ends of said conical portions and said spacing discs each having a central portion lying between the peripheral flange portions of two neighbouring rubber bushes, an internal surface surrounding the conical portion of one of the two neighbouring rubber bushes, and a rim portion projecting beyond both faces of the central portion to embrace the adjacent ends of the flange portions of the neighbouring rubber bushes to align them axially in said gland body and to form between each two spacing discs an annular chamber whose side walls are formed by the rim portions of the said discs and whose inner circumferential wall is formed by the flange portion of the rubber bush between said two discs and whose outer circumferential wall is formed by the wall of said cylinder, the rim portion of each disc having a plurality of circumferentially distributed apertures whereby said annular chambers are in communication with one another and the central part of each disc having a plurality of passages extending from said apertures in the rim portion to the internal surface of the disc, an annular feed chamber, means securing said feed chamber to said gland body, and means including a plurality of longitudinally extending ports in one of said end walls for conveying liquid under pressure from said annular feed chamber to the intercommunicating annular chambers between said rubber bushes and the circumferential wall of said gland body, said longitudinally extending ports being symmetrically distributed around the central cable aperture.

4. A gland for effecting a seal between a wall of a vessel containing fluid under pressure and a cable passing through the wall, comprising a cylindrical gland body having a circumferential wall, a centrally apertured fixed end wall and a correspondingly apertured detachable end wall movable relative to the fixed end wall in the direction of the axis of the gland body, a plurality of soft rubber bushes and intercalated annular spacing discs housed in said gland body and clamped between said end walls, said rubber bushes having centrally apertured inner conical portions and peripheral flange portions at the larger ends of said conical portions and said spacing discs each having a central portion lying between the peripheral flange portions of two neighbouring rubber bushes, an internal surface surrounding the conical portion of one of the two neighbouring rubber bushes, and a rim portion projecting beyond both faces of the central portion to embrace the adjacent ends of the flange portions of the neighbouring rubber bushes to align them axially in said gland body and to form between each two spacing discs an annular chamber whose side walls are formed by the rim portions of the said discs and whose inner circumferential wall is formed by the flange portion of the rubber bush between said two discs and whose outer circumferential wall is formed by the wall of said cylinder, the rim portion of each disc having a plurality of circumferentially distributed apertures whereby said annular chambers are in communication with one another and the central part of each disc having a plurality of passages extending from said apertures in the rim portion to the internal surface of the disc, a tube having a conical external surface, means for securing said tube to said gland body to make joint between an end face on said tube and a face on the fixed end wall of said gland body, a ring fitting on the conical external surface of said tube and having in its internal surface a groove forming an annular feed chamber surrounding said tube, and means for conveying liquid under pressure to said annular feed chamber, the fixed end wall of said gland body having a plurality of longitudinally extending ports and the wall of the said tube having a plurality of longitudinally and radially extending passages, whereby said annular feed chamber is in communication with said annular chambers between said rubber bushes and the circumferential wall of said gland body.

5. A gland for effecting a seal between a wall of a vessel containing fluid under pressure and a cable passing through the wall, comprising a cylindrical gland body having a centrally apertured wall at one end and a screw threaded external surface at the other end, a centrally apertured nut engaging said screw threaded end of said gland body and having an annular hub portion directed towards the interior of said gland body, a plurality of soft rubber bushes and intercalated spacing discs clamped between said centrally apertured wall and an end face of said annular hub portion, said rubber bushes having centrally apertured inner conical portions and peripheral flange portions at the larger ends of said conical portions and said spacing discs each having a centrally apertured central portion lying between the peripheral flange portions of two neighbouring rubber bushes, an internal surface surrounding the conical portion of one of the two neighbouring rubber bushes, and a rim portion projecting beyond both faces of the central portion to embrace the adjacent ends of the flange portions of the neighbouring rubber bushes to align them axially in said gland body and to form between each two spacing discs an annular chamber whose side walls are formed by the rim portions of the said discs and whose inner circumferential wall is formed by the flange portion of the rubber bush between said two discs and whose outer circumferential wall is formed by the wall of said cylinder, the rim portion of each disc having a plurality of circumferentially distributed apertures whereby said annular chambers are in communication with one another and the central part of each disc having a plurality of passages extending from said apertures in the rim portion to the internal surface of the disc, said nut having in its wall, ports leading from its central aperture to an annular groove around the annular hub portion and the circumferential wall of said gland body having at least one passage leading from said annular groove to a recess in the external surface of said circumferential wall forming an opening for the supply of liquid under pressure for conveyance through said passage, said annular groove and said ports to the central aperture of said nut.

6. A sealing gland for limiting the escape of fluid under super-atmospheric pressure from a vessel through an opening in the wall of the vessel during the passage of a cable through the opening, said gland comprising a gland body in the form of a cylinder, a plurality of soft rubber bushes housed in said gland body, each of said bushes comprising a peripheral flange portion of substantially less diameter than the bore of said cylinder and united to the larger end of an inner conical portion having a central aperture for the cable, a plurality of annular spacing discs intercalated in said plurality of soft rubber bushes, each of said discs having a central portion which lies between the flange portions of two neighbouring rubber bushes and a rim portion which is a sliding fit in said cylinder and projects beyond both faces of the central portion to embrace the adjacent ends of the flange portions of the neighbouring rubber bushes whereby to maintain the bushes in axial alignment with one another and the gland body and to form between each two spacing discs an annular chamber whose side walls are formed by the rim portions of the said discs and whose inner circumferential wall is formed by the flange portion of the rubber bush between said two discs and whose outer circumferential wall is formed by the wall of the said cylinder, each of said discs having in its rim portion a number of longitudinally extending apertures whereby said annular chambers are placed in communication with one another and each having a plurality of passages distributed around its periphery and all extending inwardly from said longitudinally extending apertures and directed towards the external surface of the conical part of one of the two neighbouring rubber bushes and opening into the spaces between the conical parts of said bushes, and means comprising centrally apertured end walls on said gland body relatively adjustable in the direction of the axis of said gland body for clamping the peripheral flange portions of the rubber bushes and the intercalated spacing discs together, the gland body having in one wall thereof at least one port for the supply of counter-pressure liquid to the intercommunicating annular chambers.

References Cited in the file of this patent

UNITED STATES PATENTS

| Number | Name | Date |
|---|---|---|
| 1,991,714 | Wheeler | Feb. 19, 1935 |
| 1,996,780 | Wheeler | Apr. 9, 1935 |
| 2,065,020 | Picard et al. | Dec. 22, 1936 |
| 2,082,107 | Howard | June 1, 1937 |
| 2,175,868 | Bentley | Oct. 10, 1939 |